United States Patent
Giroud et al.

(10) Patent No.: US 10,758,760 B2
(45) Date of Patent: Sep. 1, 2020

(54) METHOD AND SYSTEM FOR INERTING A FUEL TANK

(71) Applicant: Zodiac Aerotechnics, Roche La Moliere (FR)

(72) Inventors: Nelly Giroud, Saint Etienne (FR); Bruno Reynard, Francheville (FR); Olivier Vandroux, Grenoble (FR); Emilie Mysliwiec, La Talaudiere (FR)

(73) Assignee: Zodiac Aerotechnics, Roche La Moliere (FR)

( * ) Notice: Subject to any disclaimer, the term of this patent is extended or adjusted under 35 U.S.C. 154(b) by 290 days.

(21) Appl. No.: 15/654,241

(22) Filed: Jul. 19, 2017

(65) Prior Publication Data
US 2018/0036565 A1 Feb. 8, 2018

(30) Foreign Application Priority Data

Aug. 3, 2016 (FR) ..................... 16 57547

(51) Int. Cl.
| | |
|---|---|
| B64D 37/32 | (2006.01) |
| A62C 99/00 | (2010.01) |
| A62B 7/14 | (2006.01) |
| A62C 3/08 | (2006.01) |
| B64D 37/04 | (2006.01) |
| A62C 3/06 | (2006.01) |

(52) U.S. Cl.
CPC ............ *A62C 99/0018* (2013.01); *A62B 7/14* (2013.01); *A62C 3/08* (2013.01); *B64D 37/04* (2013.01); *B64D 37/32* (2013.01); *A62C 3/06* (2013.01)

(58) Field of Classification Search
CPC . B64D 37/32; A62C 99/0018; A62C 99/0027; A62C 3/06; A62C 3/08
See application file for complete search history.

(56) References Cited

U.S. PATENT DOCUMENTS

| | | | |
|---|---|---|---|
| 8,245,978 B1 | 8/2012 | Beers et al. | |
| 9,994,331 B2* | 6/2018 | Family | B64D 37/32 |
| 2005/0286054 A1* | 12/2005 | Chen | G01N 21/3504 |
| | | | 356/437 |
| 2006/0021652 A1 | 2/2006 | Surawski | |
| 2006/0163483 A1* | 7/2006 | Chabanis | B64D 37/32 |
| | | | 250/339.12 |
| 2007/0054610 A1* | 3/2007 | Jensen | B64D 37/32 |
| | | | 454/74 |
| 2008/0196907 A1* | 8/2008 | Wagner | A62C 99/00 |
| | | | 169/45 |

(Continued)

FOREIGN PATENT DOCUMENTS

| | | |
|---|---|---|
| EP | 2808060 | 12/2014 |
| WO | WO-2015063406 | 5/2015 |

OTHER PUBLICATIONS

Republique Francaise, Rapport De Recherche Preliminaire for Corresponding French Application No. 1657547 (7 pgs).

*Primary Examiner* — Richard R. Green
*Assistant Examiner* — Michael A. Fabula
(74) *Attorney, Agent, or Firm* — Harris Beach PLLC

(57) ABSTRACT

A method for the inerting of at least one fuel tank of an aircraft, by means of at least one inert gas generation system, remarkable in that the inert gas generation system is started when at least one oxygen sensor within the tank measures an oxygen level that is above a high threshold.

12 Claims, 1 Drawing Sheet

(56) References Cited

U.S. PATENT DOCUMENTS

| | | | |
|---|---|---|---|
| 2014/0353427 A1* | 12/2014 | Meckes | A62C 3/08 |
| | | | 244/129.2 |
| 2015/0219554 A1* | 8/2015 | Hedges | G01N 21/39 |
| | | | 244/135 R |
| 2016/0009407 A1 | 1/2016 | Fukuda | |
| 2016/0176535 A1* | 6/2016 | Family | B64D 37/32 |
| | | | 701/3 |
| 2016/0257419 A1* | 9/2016 | Artaud | A62C 3/08 |
| 2016/0361684 A1* | 12/2016 | Ranjan | B01D 53/22 |

* cited by examiner

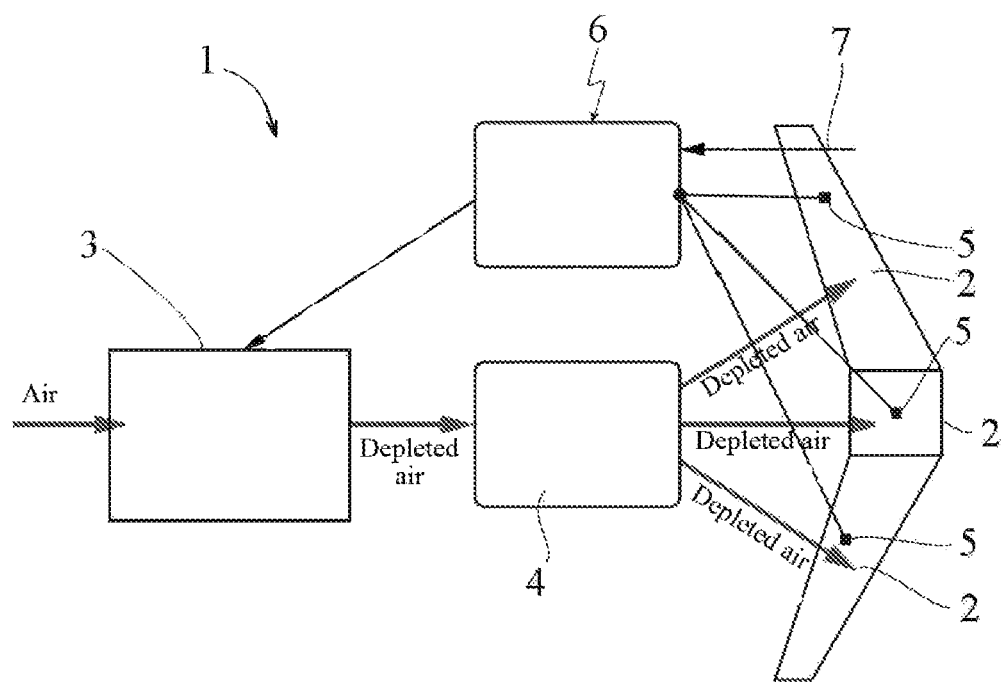

METHOD AND SYSTEM FOR INERTING A FUEL TANK

CROSS-REFERENCE TO RELATED APPLICATIONS

This application claims the benefit of French Patent Application No. 1657547, filed on Aug. 3, 2016. The entirety of this application is incorporated herein by reference.

ART

This invention relates to a method and a system for inerting the fuel tank of an aircraft, such as an airplane, a helicopter or similar.

PRIOR ART

In the art of aeronautics, the use of an inerting system is well known for the generation of an inert gas, such as nitrogen or any other inert gas such as carbon dioxide, and for introducing said inert gas into fuel tanks for safety reasons in order to reduce the risk of explosion from said tanks.

A conventional prior art inerting system typically includes an on board inert gas generation system (OBIGGS), supplied with air, for example with compressed air diverted from at least one engine, from the so-called intermediate pressure stage and/or the so-called high pressure stage depending on the flight situation. It should be noted that the use of compressed air for the air conditioning is advantageous because the compressed air has a relatively high temperature and pressure, such that the air can be adjusted to a wide range of desired pressure and temperature settings. The OBIGGS system is connected to the airplane fuel tank and separates oxygen from the air.

The OBIGGS system comprises at least one air separation module containing, for example, permeable membranes, such as polymer membranes, crossed by a stream of air. Due to the different permeabilities of the membrane to nitrogen and oxygen, the system splits the air flow such that an air flow with a high nitrogen content and an air flow with a high oxygen content are obtained. The air fraction enriched with nitrogen, considered to be the inert gas, is routed into the fuel tanks such that the mixture of air and kerosene vapor present at this location is displaced and discharged from the tanks. The devices required for this process such as compressors, filters, and air or water cooling modules or similar are integrated into the inerting system.

When the level of oxygen in the empty part of the tank is below the ignition limit defined in accordance with the Federal Aviation Administration (FAA) requirements detailed in AC25.981-2A dated Sep. 19, 2008 and entitled "FUEL TANK FLAMMABILITY REDUCTION MEANS" and its appendices, no ignition may occur. From the foregoing, inerting a fuel tank consists in injecting an inert gas into the tank in order to keep the oxygen level within said tank below a certain threshold, for example 12%.

The international patent application WO 2015/063406, filed under the Applicant's name, is known in the prior art. This international application describes a method and a system for inerting an aircraft fuel tank with a simple and inexpensive design, making it possible to adapt the distribution of inert gas to the actual requirement thereof in order to indirectly reduce the fuel consumption of the aircraft.

This inerting method is implemented within an aircraft comprising of at least one inert gas generation system and includes at least the steps consisting in:
- determining, in real-time, the requirement for inert gas of at least one tank during the use of the aircraft, according to a measurement, in real time, of the oxygen level within the tank, and information relating to the flight of the aircraft;
- determining, in real-time, a flow rate set-point for the inert gas generation system as a function of the previously calculated inert gas requirement, and transmitting, in real time, said set-point to means of controlling the inert gas generation system flow rate,
- determining at least a control set-point for the distribution of inert gas into the tank, and transmitting in real-time said set-point to means of controlled distribution of the inert gas into the tank.

Thus, this inerting method makes it possible to adapt the distribution of inert gas to the actual requirement thereof, and makes it possible to indirectly reduce fuel consumption.

However, the inert gas injection can be adjusted in a finer manner in order to correspond more to actual requirements, and to reduce the consumption of energy and indirectly of fuel for the aircraft.

DISCLOSURE OF THE INVENTION

One of the objectives of the invention is therefore to provide an inerting method that has been perfected in the sense that it makes it possible to further reduce fuel consumption and those costs associated with the operation of an inerting system.

For this purpose, and in accordance with the invention, a method is proposed for the inerting of at least one fuel tank of an aircraft, by means of at least one inert gas generation system, remarkable in that the inert gas generation system is started when at least one oxygen sensor within the tank measures an oxygen level that is above a high threshold value, such as for example 10% oxygen.

In this way, the method according to the invention makes it possible to adapt the distribution of inert gas to the actual requirement thereof in order to meet the regulations in force, while at the same time reducing energy consumption and indirectly fuel consumption.

Preferably, in order to further reduce fuel consumption, the inert gas generation system is stopped when the measured oxygen level is below a low threshold value, such as for example 8% oxygen.

In other words, inert gas injection begins when the oxygen level within the tank is above 10%, and continues until the oxygen level reduces to below 8%. In order to save energy, once below 8%, the inert gas generation system is stopped. This low threshold value makes it possible to stop the inert gas generation system for a certain duration before the oxygen level rises to a value above 10%, thereby causing said generation system to restart.

Whatever the case, according to another feature of the invention and in order to safely prepare for the descent phase of the aircraft, the inert gas generation system is restarted when the means of information regarding the flight of the aircraft indicate a number of minutes, for example 70 minutes, before the beginning of the descent phase of the aircraft. The number of minutes depends upon the downtime of the generation system and the environmental conditions.

A system has also been developed for inerting a fuel tank, said system including at least one inert gas generation system supplied with air, means for the distribution and injection of inert gas into the fuel tank, connected to the inert gas generation system, and at least one oxygen sensor installed within the tank.

According to the invention, the system includes a management unit connected to the oxygen sensor and to the inert gas generation system, that is programmed to register measurements from the oxygen sensor in real time, and to start the inert gas generation system when the oxygen level measurement is above a high threshold value, such as for example 10% oxygen.

In a specific embodiment, the management unit is also programmed to stop the inert gas generation system when the oxygen level measurement is below a low threshold value, such as for example 8% oxygen.

Advantageously, the management unit is also programmed to register, in real-time, information regarding the mission of the aircraft, for example from the aircraft computer, and to restart the inert gas generation system when the information it registers regarding the mission of the aircraft indicates a specific number of minutes, for example 70 minutes, before the beginning of the descent phase of the aircraft.

BRIEF DESCRIPTION OF THE FIGURES

Other advantages and features will become more apparent from the following description, given as a non-limiting example, of a method for the inerting of an aircraft fuel tank according to the invention, beginning with the single FIG. 1 which schematically illustrates an inerting system for the implementation of said method.

DETAILED DESCRIPTION OF THE INVENTION

With reference to FIG. 1, an inerting system (1) is represented for a fuel tank (2) of an aircraft, such as an airplane or a helicopter for example or similar for the implementation of the inerting method according to the invention.

The inerting system (1) comprises at least one inert gas generation system (3) supplied with air, for example with compressed air diverted from the engines and/or air from the passenger cabin. The inert gas generation system (3) has an outlet for depleted oxygen air equivalent to the inert gas. The inert gas generation system (3) may consist in any inert gas generation system (3) well known to those skilled in the art, such as a membrane separation system and/or a fuel cell for example.

The inert gas is then conveyed to inert gas distribution means (4) for injection as such into the aircraft fuel tank(s) (2). The distribution means (4) are well known in the prior the art and comprise, for example, distribution pipes, valves, and injection nozzles.

Thus, the system makes it possible for an inert gas to be generated and introduced into an aircraft fuel tank(s) (2) for safety reasons in order to reduce the risk of explosion from said tanks (2). The injected inert gas aims to render the fuel tank(s) (2) inert, i.e. allows the level of oxygen present within said tank(s) (2) to be reduced, and notably to maintain this level below a certain threshold, preferably less than 12%.

Furthermore, the fuel tank(s) (2) has (have) oxygen sensors (5) to measure, in real time, the oxygen level within said fuel tanks (2), during the use of the aircraft. The oxygen level measurement is then sent, in real time, to a management unit (6) that also registers, in real time, information (7) relating to the mission of the aircraft, i.e., all of the different flight phases, the duration thereof, the rate of descent or rate of climb thereof, etc. All of this information (7) is supplied, in real time, by the aircraft computer for example.

The management unit (6), which consists for example of an electronic board including software, is connected to the inert gas generation system (3), and is programmed to start said inert gas generation system (3) when at least one oxygen sensor (5) measures an oxygen level above a high threshold value, such as for example 10% oxygen. The management unit (6) is also connected to the distribution means (4) in order to convey the inert gas towards the fuel tank(s) (2) requiring an injection of inert gas as a function of the measured oxygen level thereof.

The injection of inert gas continues until the oxygen sensors (5) measure an oxygen level below 8%. When the measured oxygen level is below 8%, the management unit (6) stops the inert gas generation system (3) in order to save energy. This low threshold value makes it possible to stop the inert gas generation system (3) for a certain duration before the oxygen level rises to a value above 10%, thereby causing said generation system (3) to restart. Of course, depending upon the chosen low threshold value, sometimes, as a function of the aircraft flight conditions, the oxygen level will not have time to rise to a critical value that would not satisfy the applicable standard prior to the landing of the aircraft. Thus, the inert gas generation system (3) is not turned on for the remaining duration of the flight.

The inert gas injection is performed over a range of values for the oxygen level within the tanks (2), thus making it possible to save energy and indirectly to save fuel. Furthermore, insofar as it is used for shorter periods of time, this also saves on the maintenance of equipment, extending the life expectancy thereof.

Whatever the case, according to another feature of the invention and in order to safely prepare for the descent phase of the aircraft, the management unit (6) is programmed to restart the inert gas generation system (3) when the information (7) it registers regarding the mission of the aircraft indicates a certain number of minutes, for example 70 minutes, before the beginning of the descent phase of the aircraft. The number of minutes depends upon the downtime of the generation system and the environmental conditions.

The invention claimed is:

1. A method for inerting at least one fuel tank of an aircraft, by means of at least one inert gas generation system, comprising: measuring an oxygen level and comparing said oxygen level to a high threshold and a low threshold, wherein the at least one inert gas generation system is turned on and injects inert gas into the at least one fuel tank when at least one oxygen sensor within the tank measures an oxygen level that is above said high threshold value, and the at least one inert gas generation system is turned off when the measured oxygen level is below said low threshold value.

2. The method according to claim 1, wherein the high threshold value is 10% oxygen.

3. The method according to claim 1, wherein the low threshold value is 8% oxygen.

4. The method according to claim 1, wherein the at least one inert gas generation system is turned on when a means of information regarding a flight of the aircraft indicate a determined number of minutes before a beginning of a descent phase of the aircraft.

5. A system for the inerting of at least one fuel tank of an aircraft, said system including at least one inert gas generation system supplied with air, means for the distribution and injection of an inert gas into the at least one fuel tank connected to the at least one inert gas generation system, and at least one oxygen sensor installed within the at least one fuel tank, wherein the system for the inerting includes a management unit connected to the at least one oxygen sensor and to the at least one inert gas generation system, that is programmed to register measurements from the at least one oxygen sensor in real time, and to turn on the at least one inert gas generation system and to inject the inert gas into the fuel tank when an oxygen level measurement is above a high threshold value and the management unit is programmed to turn off the at least one inert gas generation system when the oxygen level measurement is below a low threshold value.

6. The system according to claim 5, wherein the high threshold value is 10% oxygen.

7. The system according to claim 5, wherein the low threshold value is 8% oxygen.

8. The system according to claim 5, wherein the management unit is programmed to register, in real time, information regarding a mission of the aircraft and to turn on the at least one inert gas generation system when the registered information indicates a duration before a beginning of a descent phase of the aircraft of less than 70 minutes.

9. A method for inerting at least one fuel tank of an aircraft, by at least one inert gas generation system comprising:
    turning on the at least one inert gas generation system and injecting inert gas into the at least one fuel tank when at least one oxygen sensor within the at least one tank measures an oxygen level that is above a high threshold value; and
    turning off the at least one inert gas generation system when a measured oxygen level is below a low threshold value.

10. The method according to claim 9, wherein the high threshold value is 10% oxygen.

11. The method according to claim 9, wherein the low threshold value is 8% oxygen.

12. The method according to claim 9, wherein the at least one inert gas generation system is turned on when information regarding the flight of the aircraft as provided by a management unit which comprises an electronic board including software that is connected to an aircraft computer indicates a determined number of minutes before a beginning of a descent phase of the aircraft.

\* \* \* \* \*